United States Patent [19]

Faiks

[11] 4,018,102
[45] Apr. 19, 1977

[54] MOVEMENT DEVICE

[75] Inventor: Frederick S. Faiks, Comstock Park, Mich.

[73] Assignee: Steelcase, Inc., Grand Rapids, Mich.

[22] Filed: Sept. 6, 1973

[21] Appl. No.: 394,829

Related U.S. Application Data

[62] Division of Ser. No. 310,411, Nov. 29, 1972, Pat. No. 3,883,192.

[52] U.S. Cl. .................... 74/501 R; 74/37; 74/216.5
[51] Int. Cl.$^2$ ............................. F16C 1/10
[58] Field of Search ............. 74/25, 89.21, 89.22, 74/89.2, 501, 206, 207, 238, 502, 493 PB; 308/3, 3.5, 4, 4 A

[56] References Cited

UNITED STATES PATENTS

| | | | |
|---|---|---|---|
| 1,072,439 | 9/1913 | Duryea | 74/501 |
| 1,983,962 | 12/1934 | Barber et al. | 74/501 |
| 2,799,180 | 7/1957 | Madunich | 74/501 |
| 3,605,932 | 9/1971 | Wllfert et a. | 74/501 |

*Primary Examiner*—Samuel Scott
*Assistant Examiner*—Wesley S. Ratliff, Jr.
*Attorney, Agent, or Firm*—Price, Heneveld, Huizenga & Cooper

[57] ABSTRACT

A movement device including a rigid inner supporting rod-like member of a closed circuit configuration and a flexible, closed sleeve slidably mounted on the rod-like support member. In one application of the invention, a drawer or the like can be moved relative to a case or the like by securing the drawer to the sleeve and securing the case to the sleeve at points on opposite sides of a point at which the rod-like support member changes direction. In another application, the device is used as a tilting mechanism for chairs by securing the chair body to the sleeve and securing the chair base to the sleeve at points opposite a point at which the rod-like member changes direction. The chair base can be eliminated by setting the rigid rod-like member directly on the floor. The device also provides a rotatable base for a stool. In another application, the device is used as a bearing between a shaft and a bearing sleeve, the shaft frictionally engaging the flexible sleeve on the inside of the closed circuit and the bearing sleeve frictionally engaging the flexible sleeve on the outside of the closed circuit configuration. In another application, the device is used as a drive pulley by supportably engaging the flexible sleeve by several pulley wheels at two spaced points whereby the rotation of one pulley wheel causes the sleeve to slide on the rigid rod-like member and rotates the other pulley wheels.

3 Claims, 21 Drawing Figures

MOVEMENT DEVICE

CROSS REFERENCE TO RELATED APPLICATION

This is a divisional application of parent application Ser. No. 310,411, filed Nov. 29, 1972, now U.S. Pat. No. 3,883,192, and entitled MOVEMENT DEVICE.

BACKGROUND OF THE INVENTION

The present invention is a revolutionary approach to facilitating relative movement between two or more objects. Its diverse applications include drawer suspensions, chair tilt mechanisms, stool rotating mechanisms, pulley drive systems, bearings and others. In its various applications, it replaces ball bearings and bearing raceways, pulleys and belts, wheels, and various combinations of such devices.

Movement devices generally require lubrication. Such lubrication is either exposed or must be very carefully housed. When exposed, it is subject to dust contamination and lubrication loss. Housings on the other hand, are costly.

Pulley devices require no lubrication, but in many applications require complicated mounting systems and a number of different components. When used as drives around interfering objects, such as beams, air ducts, or the like, this is particularly true. A separate wheel is required every time the pulley belt must change direction.

One prior art bearing device which avoids the need for lubrication employs a looped, flexible spring steel band for effecting oscillatory motion between objects. One object is secured to the band at one point and another object is secured to the band at the other point. While such a device does not require lubrication, it still requires pulley wheels if its configuration is to be anything other than generally an ellipse. The device is applicable only where oscillatory movement is employed, since the objects are fixedly mounted to the steel band at spaced points. Finally, separate supporting means must be employed to support one object or another since the flexible band will collapse under a weight load.

SUMMARY OF THE INVENTION

The present invention is a self-supporting movement device which can be given any desired configuration and which has numerous diverse applications. Basically, its components include a rigid rod-like support including at least one change of direction in its configuration and a flexible sleeve slidably carried on the support. By securing mounting means for one object and mounting means for another object on the flexible sleeve at points opposite the point at which the rod changes direction, one can effect relative movement of the two objects by sliding the sleeve along the rod. In actual operation, one of the objects would probably be fixed, in which case movement of the other object causes the sleeve to slide on the rigid support and causes the rigid support to actually travel with respect to the fixed object.

If the application requires lubrication between the support rod and the sleeve, the supporting rod is given a completely closed circuit configuration. Similarly, the flexible sleeve is made to completely enclose the rigid support and also define a closed circuit configuration. Lubrication can be placed in the flexible sleeve prior to its sealing and such lubrication will never be exposed to contamination or loss.

One application of the invention is as a drawer suspension. A drawer mounting means is joined to the flexible sleeve and a case mounting means is joined to the flexible sleeve, the two mounting means being joined on opposite sides of a point at which the rigid support changes direction. By varying the configuration of the rigid support, one can obtain any number of different paths of motion for the drawer relative to the case. Thus, it is actually possible to design a drawer suspension in which a drawer not only travels outwardly, but downwardly or upwardly with respect to the case.

The device can be used as a tilt mechanism for chairs by securing a chair body to the flexible sleeve on two different legs of a triangular-shaped support rod, and by securing the third leg of the triangle to a chair base. The chair tilts rearwardly or forwardly and simultaneously moves slightly rearwardly or forwardly with respect to the base. The base leg of the triangle need not be secured to a chair base, but can be seated directly on the floor. Other types of chair constructions can also be effected. By mounting a seat atop two movement devices, each shaped generally to outline a half cylinder, one has a stool which rotates.

The invention can be employed as a bearing between a shaft or the like and a bearing sleeve or the like. The shaft engages the flexible sleeve on the inside of the closed circuit configuration and the bearing sleeve engages the flexible sleeve on the outside of the closed circuit. Rotation of the shaft causes the sleeve to slide on the support member and causes the entire support member to rotate relative to the bearing sleeve. This is a perfectly sealed bearing.

Finally, yet another application of the device is as a pulley mechanism. A support member of closed circuit configuration is supportably engaged by at least two pulley wheels. The pulley wheels frictionally engage the flexible sleeve whereby the rotation of one pulley wheel causes the sleeve to slide on the rigid support and effect rotation of the other pulley wheel.

These and other applications, features, objects and advantages of the invention will be more fully understood and appreciated by reference to the written specification and appended drawings.

DESCRIPTION OF THE PREFERRED EMBODIMENT

Figure 4:
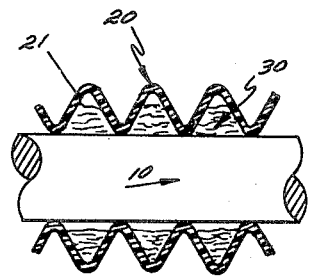
FIG. 4 is an enlarged, fragmentary, partially cross-sectional view taken generally along plane IV—IV of FIG. 1.
Figure 5:
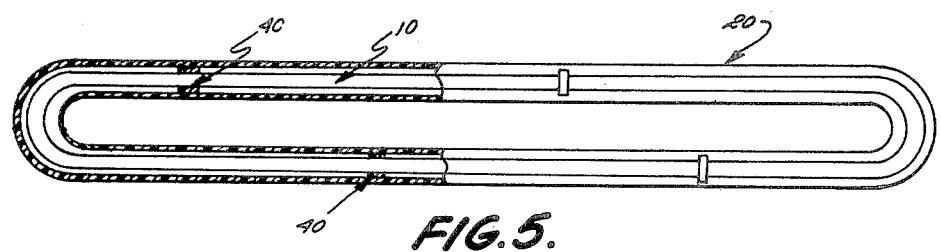
FIG. 5 is a side elevational view of an alternative embodiment of the invention.

In all of the various applications and configurations of the invention set forth in the preferred embodiment, the movement device 1 comprises a rigid, rod-like support 10 encased by a continuous, flexible sleeve 20 which is slidably mounted on support rod 10. In various applications, lubricating fluid 30 can be placed in sleeve 20 (FIG. 4). Preferably, flexible sleeve 20 is non-collapsible, thereby minimizing binding between sleeve 20 and support rod 10, particularly at the corners of support rod 10. Bearings slidably mounted on support rod 10 can be placed within sleeve 20 to minimize such binding (FIG. 5). Another alternative is to fill sleeve 20 with air or to use a corrugated tubing which minimizes contact between support rod 10 and sleeve 20. The invention has application as a drawer suspension (FIGS. 6 through 12), a chair-tilting or rotating mechanism (FIGS. 13 through 18), a bearing device (FIGS. 19 and 20), and as a drive pulley mechanism (FIG. 21).

Figure 3:
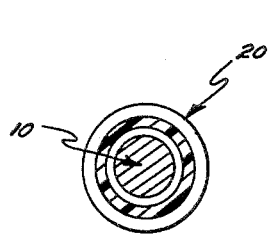
FIG. 3 is a cross-sectional view taken along plane III—III of FIG. 1.

Support rod 10 is a steel rod. Its surface is smooth and it is preferably round or elliptical in cross section (FIG. 3). Other cross-sectional configurations may have application in some instances, but the round or elliptical configuration provides the smoothest running surface for sleeve 20.

The configuration into which support rod 10 is bent depends on the application for which it is intended. Typically, however, a closed circuit configuration is desired, since this makes it possible to have a completely closed system within which to maintain lubricating fluid. The corners of support rod 10 must be rounded gracefully wherever support 10 changes direction in order to minimize binding of sleeve 20 at the corners.

Figure 1:
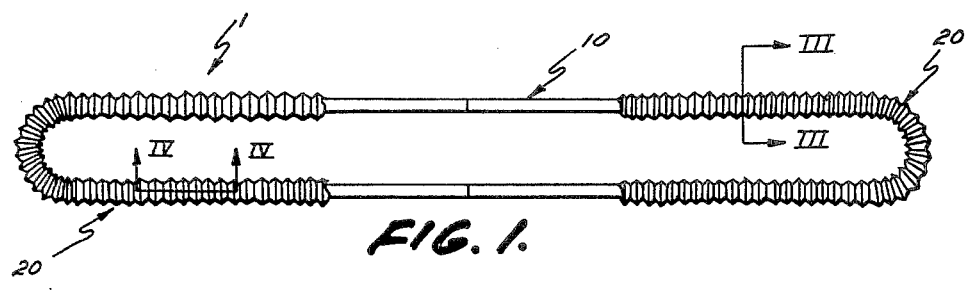
FIG. 1 is an elevational view of the movement device embodying the present invention with the central portion of the flexible sleeve broken away to show the manner in which sections of the rigid rod are joined together.
Figure 2:
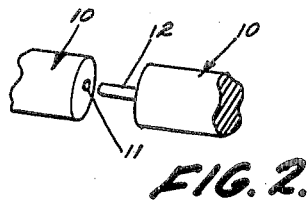
FIG. 2 is an enlarged, fragmentary view of the ends of a pair of segments of rigid support rod as they are being joined together.

Support rod 10 shown in FIG. 1 is constructed by first bending its two halves into generally U-shaped members and joining their ends together as shown in FIG. 2. A pin 12 projects from the end of one half and fits very snugly into a receiving hole 11 in the end of the other half. Connection can also be effected by welding, it being necessary to smooth the welded surface so that it corresponds to the smooth surface of the rest of rod 10.

Flexible sleeve 20 comprises a length of flexible tubing made of a material such as plastic or the like. Sleeve 20 should be noncollapsible or somehow rendered noncollapsible. This minimizes the extent to which sleeve 20 will bind against the surface of rod 10. Such binding is particularly likely to occur at the corners of rod 10. One way to effect such noncollapsibility is through the selection of a proper plastic material.

In the embodiment shown in FIG. 1, a piece of corrugated tubing is used as sleeve 20. Not only dose this minimize the tendency of sleeve 20 to collapse, but also, it minimizes friction by minimizing the extent of surface contact between sleeve 20 and support rod 10. Finally, convenient pockets 21 are provided by the corrugation for storing lubricating fluid therein and thereby insuring proper distribution of lubrication (FIG. 4).

Sleeve 20 might be filled with air in order to minimize the tendency to collapse. In some applications, gases other than air might be employed depending on the particular needs of the application.

In the alternative embodiment of the device shown in FIG. 5, flexible sleeve 20 comprises a piece of non-corrugated plastic tubing. To minimize collapsing and friction, several bearings 40 are slidably mounted on support rod 10 within sleeve 20.

In the embodiment of the invention shown in FIG. 1 or FIG. 5, flexible sleeve 20 is assembled to rod 10 by first sliding it onto one of the two rod halves. One end of the rod half is left exposed so that it can be joined to the mating end of the other rod half. Flexible sleeve 20 is then slid over the joined portions until the other end of the first rod half is exposed and that end is then joined to the corresponding end of the other rod half. Flexible sleeve 20 is then sealed by taping the mating ends with plastic tape or by wrapping them with a piece of plastic which is then heat sealed to both of the free ends. For filling flexible sleeve 20 with air, an air valve is mounted thereon.

The lubricating fluid 30 which is selected can be either liquid or fluidized powder. Petroleum fluids are suitable as is powdered PTFE or graphite. Conceivably, the new magnetic fluids could have application here.

Figure 6:
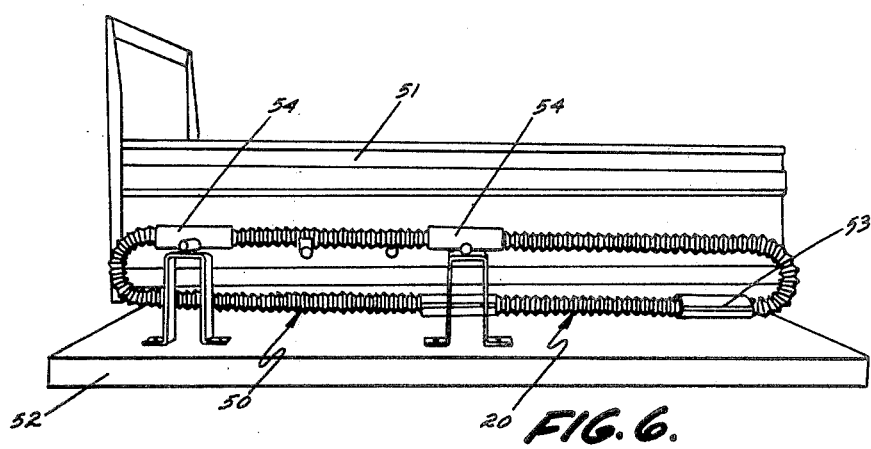
FIG. 6 is a side elevational view of a drawer suspension embodying the present invention.
Figure 7:
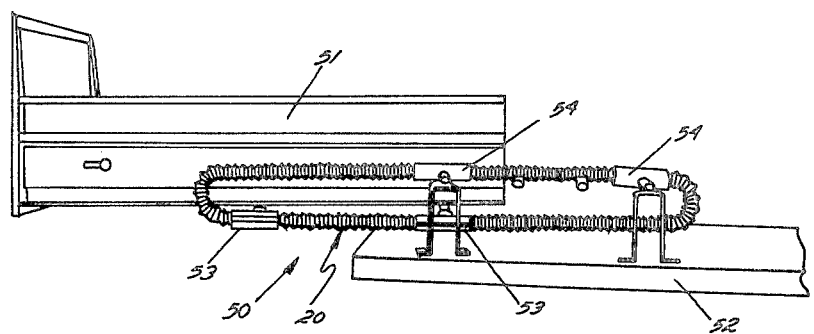
FIG. 7 is a side elevational view of the drawer suspension of FIG. 6 with the drawer in its extended position.

The principle of operation of the invention can best be illustrated by showing its application to several different devices. FIGS. 6 and 7 show the invention used in a drawer suspension. Two movement devices 1 are employed, one on each side of drawer 51. Drawer 51 is joined to flexible sleeve 20 by means of a pair of drawer mounting brackets 53. Each of the brackets 53 comprises a sleeve-like clamp that clamps around sleeve 20 and which includes an attachment flange or some other attachment means for attachment to drawer 51. The clamp must be snug on sleeve 20, but must not clamp so tightly as to restrict sleeve 20's motion with respect to rod 10.

Suspension 50 in turn is joined to case 52 (shown merely schematically for purposes of illustration) by means of case-mounting bracket 54. Brackets 54 firmly grip sleeve 20, but they do not clamp it so tightly as to restrict its motion with respect to rod 10. It is important that the two case-mounting brackets 54 and the two drawer-mounting brackets 53 be joined to sleeve 20 on opposite sides of the point where rod 10 changes direction. In this drawer suspension, rod 10 is generally rectangularly shaped, changing direction at each of its ends through gracefully rounded corners. When drawer 51 is moved, it will cause sleeve 20 to slide on rod 10. Since sleeve 20 itself is anchored with respect to case 52, rod 10 will actually travel outwardly with drawer 51, within sleeve 20. The nature of this movement will be appreciated by comparing FIGS. 6 and 7. Note that relative movement of drawer 51 with respect to case 52 is obtained only because drawer mounts 53 are on opposite sides of a change of direction in rod 10 from case mounts 54. If drawer mounts 53 and case mounts 54 were on the same leg of rigid rod 10, then there would be no movement of drawer 51 with respect to case 52 at all.

Figure 8:
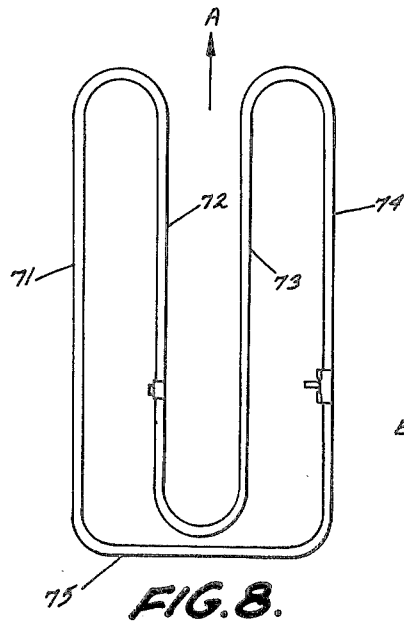
FIG. 8 is an elevational view of an alternative embodiment of the invention.

FIG. 8 shows an alternative embodiment of the movement device 70 which can be used as another type of drawer suspension. In the FIG. 8 embodiment, rod 10 is shaped generally like an "M". It has a first leg 71, a second leg 72, a third leg 73, and a fourth leg 74. Legs 71 and 72, 72 and 73, and 73 and 74, respectively, are joined by gracefully rounded corners. First leg 71 and fourth leg 74 are joined by a base 75 which extends generally below all four of the legs. In the drawer suspension of FIGS. 6 and 7 a pair of movement devices are secured at each side of drawer 51. Just one movement device made in accordance with FIG. 8 will serve as a drawer suspension for a drawer which is to be pulled straight out of its case. If one secures the drawer to sleeve 20 on first leg 71 and third leg 73 and secures the case to sleeve 20 on second leg 72 and fourth leg 74, one can pull the drawer straight out of the case by pulling in the direction of arrow "A". Sleeve 20 will travel up first leg 71 and third leg 73 and down second leg 72 and fourth leg 74.

Figure 9:
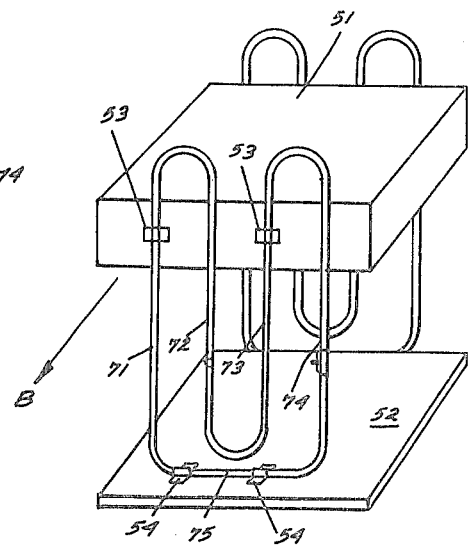
FIG. 9 is a generally perspective view of an alternative embodiment drawer suspension embodying the present invention.
Figure 10:
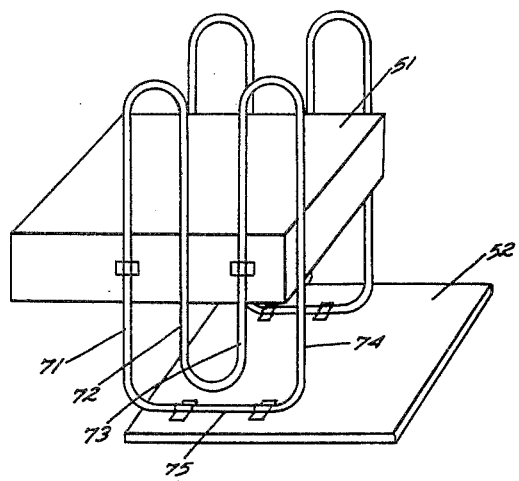
FIG. 10 is a generally perspective view of the drawer suspension of FIG. 9 with the drawer in its extended position.

In the alternative, one device 70 made in accordance with FIG. 8 can be placed at each side of a drawer 51 in the manner shown in FIGS. 9 and 10. In this drawer suspension arrangement, drawer 51 is secured by suitable drawer mount brackets 53 to first leg 71 and third leg 73 of each of the two movement devices. Case 52 is joined by case mount 54 to base leg 75, rather than to second and fourth legs 72 and 74. Now when drawer 51 is pulled outwardly, it will travel angularly downwardly, generally in the direction of arrow "B" (FIG. 9). This is because sleeve 20 will tend to move downwardly on first and third legs 71 and 73 and rearwardly on base leg 75. The relative positions of the drawer 51 and case 52 in drawer 51's closed and opened positions will be appreciated by comparing FIGS. 9 and 10.

Figure 11:
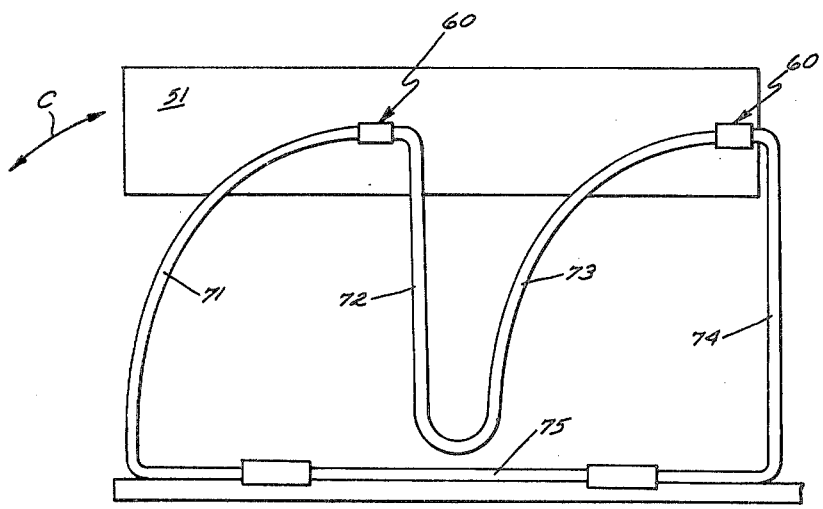
FIG. 11 is a side elevational view of yet another drawer suspension embodying the present invention.
Figure 12:
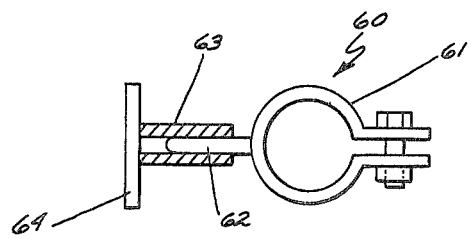
FIG. 12 is a front elevational view of a pivot mounting bracket for use in conjunction with the invention with a portion thereof being shown in cross section.

FIG. 11 shows yet a third alternative drawer suspension in which the movement device 70a is shaped generally like the movement device shown in FIGS. 9 and 10. However, first and third legs 71 and 73 are arcuately shaped rather than being rectilinearly vertical. As a result, drawer 51 will travel in an arcuate path as indicated by arrow "C" rather than traveling merely in a rectilinearly angular path. This makes it possible to pull drawer 51 levelly outwardly for a short distance before it begins its downward trajectory. Such angular movement of a drawer would be particularly useful in an overhead storage unit. One could not only withdraw a drawer from its case, but could effect a generally downward movement thereof so as to render the contents of the drawer more readily accessible when the drawer is extended. The reverse could also be true by reversing the orientation of movement devices 70a. In this embodiment, a pivotal type of mounting bracket 60 is required (FIG. 12) Bracket 60 includes a clamp 61 which clamp surrounds sleeve 20 and an axle pin 62 projecting therefrom. Axle pin 62 is received in a sleeve 63 which projects from a mounting plate 64. Mounting plate 64 is secured to drawer 51 or the like. This allows clamp 61 to swivel with respect to drawer 51 as drawer 51 is moved.

Figure 13:
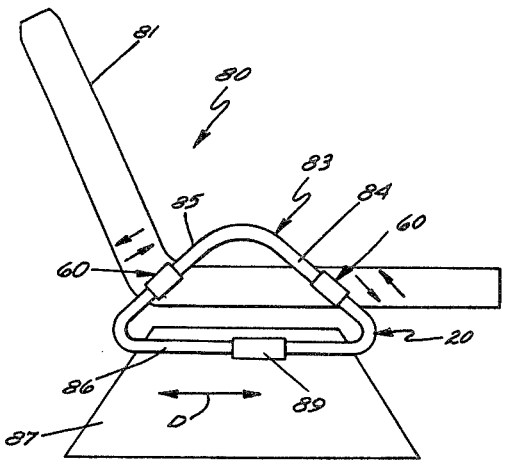
FIG. 13 is a side elevational view of a chair embodying the present invention.

FIG. 13 shows the invention employed in a chair 80. In this application, rod 10 of movement device 83 is formed into the shape of a triangle. Triangular movement device 83 has a forward leg 84, rear leg 85, and base leg 86. Chair 80 includes a chair body 81 and a base 87. Chair body 81 is secured by two separate pivot brackets 60. One is secured to sleeve 20 along front leg 84 and the other is secured to sleeve 20 along rear leg 85. Sleeve 20 along base leg 86 in turn is secured by a mounting bracket 89 to base 87. One can now readily tilt the chair in the direction indicated by the arrows drawn on the chair body. Simultaneously, the chair will move forwardly or rearwardly in the direction indicated by arrow "D".

Figure 14:
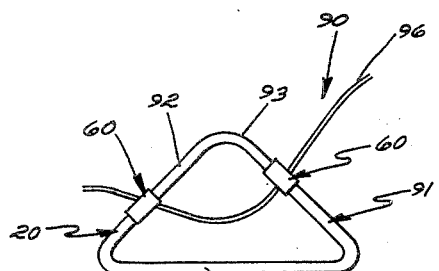
FIG. 14 is a side elevational view of another chair embodying the present invention.
Figure 15:
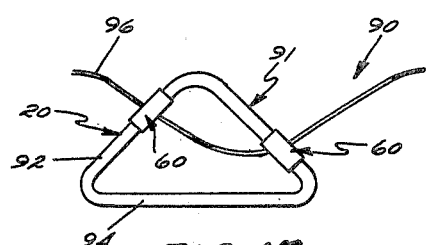
FIG. 15 is a side elevational view of the chair of FIG. 14 in a tilted position.

Chair 90 shown in FIGS. 14 and 15 is similar to chair 80 except that it employs movement devices 91 whose rods 10 comprise triangles of a larger size than triangles of movement device 83. As above, the chair body 96 of chair 90 is joined to sleeve 20 along the front leg 92 and the rear leg 93 of movement device 91 respectively by pivot mounts 60. Base leg 94 of triangular movement device 91 sits directly on the floor rather than being secured to a base. The relative movement of chair body 96 with respect to the floor is the same as is the relative movement of chair body 81 with respect to chair base 87. (Compare FIGS. 14 and 15).

Figure 16:
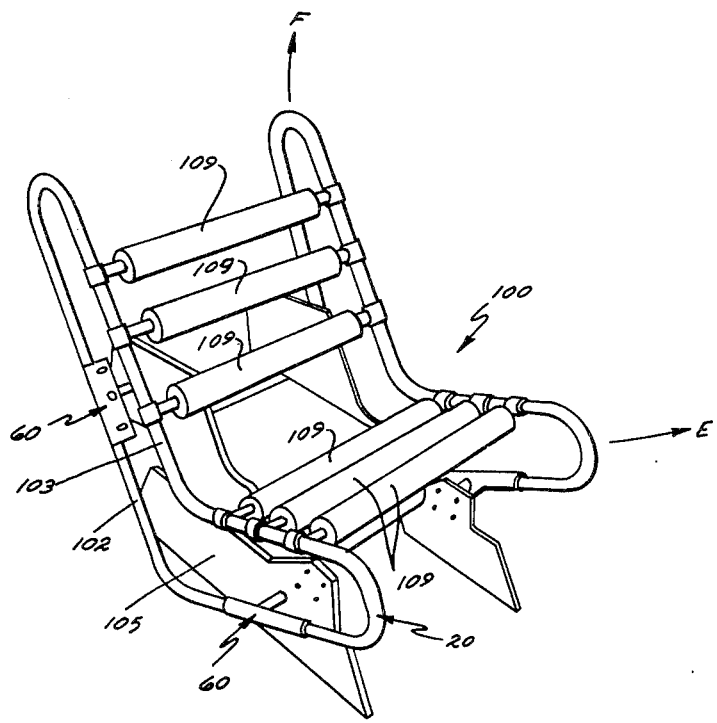
FIG. 16 is a perspective view of another chair embodying the present invention.

FIG. 16 shows yet another alternative chair 100 employing movement devices of the present invention. In chair 100, the movement devices 101 are generally "L" shaped, rod 10 comprising the bottom "L" member 102 joined to a top "L" member 103 by means of rounded corners at the ends thereof. Flexible sleeve 20 is joined to base 105 of chair 100 along the base leg of bottom "L" member 102 by means of a pivot bracket 60. Similarly, sleeve 20 is joined to base 105 along the stem of bottom "L" member 102 by means of a pivot bracket 60. Extending between the two movement devices and being joined to flexible sleeve 20 along the upper L-shaped portion 103 of the movement devices 101 are a plurality of support rollers 109. These are appropriately cushioned to provide comfortable body support. By leaning back or sitting forward, a person seated in chair 100 effects a rocking, tilting motion in the directions indicated by arrows "E" and "F". Additionally, rollers 109 roll over the user's body, thereby providing a massaging effect. Yet, the movement of the rollers does not alter the position of the user's body relative to the seat and back.

Figure 17:
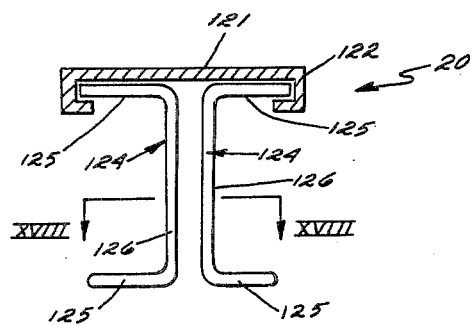
FIG. 17 is an elevational, partially cross-sectional view of a stool embodying the present invention.
Figure 18:
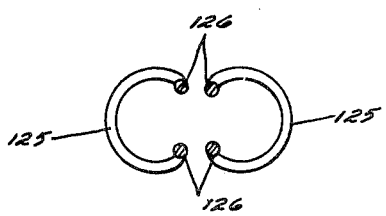
FIG. 18 is a cross-sectional view taken along plane XVIII—XVIII of FIG. 17.

FIG. 17 shows a stool 120 embodying the present invention. In stool 120, a pair of movement devices 124 are employed, each of which comprises a pair of spaced top and bottom semicircular portions 125 joined together by a pair of vertical legs 126. In effect, each movement device 124 outlines a semicylinder. A seat 121 includes a lip 122 around the perimeter thereof which seats over and engages sleeve 20 on the two upper semicircles 125 of the two supporting movement devices 124. The bottom semicircles 125 sit directly on the floor. When seat 121 is rotated, the sleeve 20 of movement devices 124 tends to slide on the upper semicircular portions 125 in the direction of rotation of seat 121, down one vertical leg 126, around the bottom semicircular portions 125, and back up the other vertical leg 126. Not only does seat 121 rotate, but also, the rigid support rods 10 within movement devices 124 also rotate to one-half of the extent which seat 121 rotates.

Figure 19:
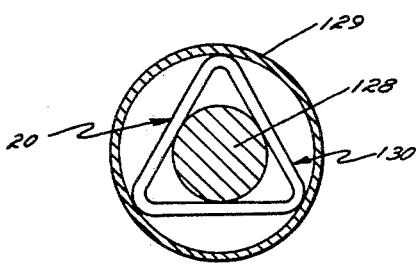
FIG. 19 is an elevational, partially cross-sectional view of a bearing embodying the present invention.
Figure 20:
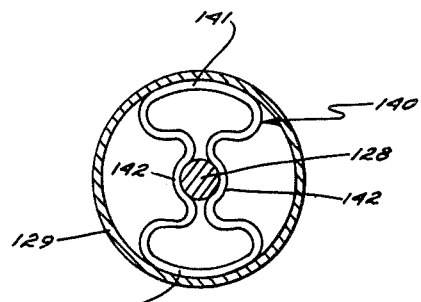
FIG. 20 is an elevational, partially cross-sectional view of another bearing embodying the present invention.
Figure 21:
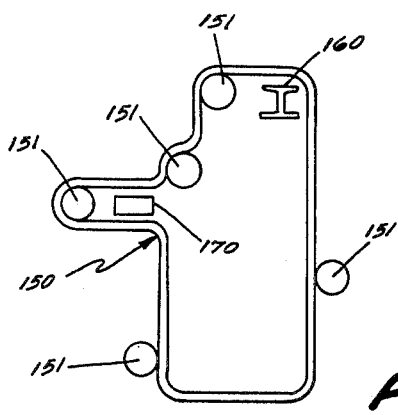
FIG. 21 is an elevational view of a drive pulley device embodying the present invention.

FIGS. 19 and 20 show alternative movement devices 130 and 140 employed as bearings between a rotating shaft 128 and a bearing sleeve 129. In both cases, the shaft 128 engages flexible sleeve 20 on the inside of the movement device and bearing sleeve 129 engages flexible sleeve 20 on the outside of the movement device. When shaft 128 is rotated, sleeve 20 moves on its rigid rod 10 and rigid rod 10 actually moves with respect to bearing sleeve 129, the latter being held stationary.

The key difference between the two bearings is the particular configuration of the rigid rod of the movement device. In movement device 130, rigid rod 10 is shaped like a triangle. Shaft 128 engages flexible sleeve 20 on the midpoints of the three legs of the triangle. Sleeve 129, in turn, engages flexible sleeve 20 at the apexes of the triangle.

Rigid rod 10 of movement device 140 is shaped like an hour glass in order to maximize the contact area between shaft 128 and flexible sleeve 20 and between bearing sleeve 129 and flexible sleeve 20. Thus, rigid rod 10 of movement device 140 includes two diametrically opposed arcuate portions 141 joined together at their ends by two inner, oppositely disposed arcuate portions 142. Flexible sleeve 20 bears against bearing sleeve 129 along the outer arcuate portions 141. Shaft 128 bears against flexible sleeve 20 along the inner oppositely disposed arcuate portions 142. Because flexible sleeve 20 makes contact along an arc, rather than merely at a point, there is less chance of slippage from either shaft 128 or bearing sleeve 129 with respect to flexible sleeve 20.

Finally, FIG. 21 shows a movement device 150 made in accordance with the present invention employed as a drive pulley. In this illustration, a plurality of pulley wheels 151 engages the flexible sleeve of a movement device 150. One of the pulley wheels 151 is driven, thereby sliding sleeve 20 along its rigid rod 10. The other pulley wheels 151 are rotated by the movement of sleeve 20 and thereby rotate the shafts on which they are mounted.

The shape of rigid rod 10 for movement device 150 will be in accordance with the necessary locations of various pulley wheels. Also, because rigid rod 10 is self-supporting, it can be shaped to pass around obstructions. No additional pulley wheels are necessary in order to avoid such obstruction. Movement device 150 has been shaped to pass around a structural eye beam 160 in the upper right-hand corner and around a heating duct 170 along the left side thereof. This greatly simplifies the mounting structure required for movement device 150. In fact, all of the pulley wheels 151 which are used can be working wheels, rather than merely idler wheels.

Thus, the present invention constitutes a fundamental contribution to devices which facilitate relative movement between two or more objects. Its applications are legion, those given in the present disclosure being merely illustrative. Indeed, it is understood that the above is merely a preferred embodiment of the invention and that various changes and alterations can be made thereof without departing from the spirit and broader aspects of the invention.

The embodiments of the invention in which an exclusive property or privilege is claimed are defined as follows.

1. A drive pulley device comprising: a rigid, generally rod-like support of a closed circuit configuration, said support being sufficiently rigid to be self-sustaining whereby it can have a configuration suitable for any drive function and capable of passing around obstructions and the like without requiring additional pulley wheels to do so; a flexible sleeve slidably mounted on said support and entirely enclosing said support to define a closed circuit, said sleeve being filled with a lubricating fluid whereby friction between said sleeve and said rigid support is minimized; and at least two pulley wheels mounted on mounting means and supportably engaging said flexible sleeve at two spaced points whereby rotation of one of said wheels causes said sleeve to slide on said support and thereby rotate the other of said wheels.

2. A drive pulley device comprising: a rigid, generally rod-like support of a closed circuit configuration, said support being sufficiently rigid to be self-sustaining whereby it can have a configuration suitable for any drive function and capable of passing around obstructions and the like without requiring additional pulley wheels to do so; a flexible sleeve slidably mounted on said support and entirely enclosing said support to define a closed circuit; bearings being slidably mounted on said rigid support within said sleeve to thereby render said sleeve more freely slidable on said rigid support and minimize the extent to which said sleeve can collapse and bind up on said rigid support; and at least two pulley wheels mounted on mounting means and supportably engaging said flexible sleeve at two spaced points whereby rotation of one of said wheels causes said sleeve to slide on said support and thereby rotate the other of said wheels.

3. A drive pulley device comprising: a rigid, generally rod-like support of a closed circuit configuration, said support being sufficiently rigid to be self-sustaining whereby it can have a configuration suitable for any drive function and capable of passing around obstructions and the like without requiring additional pulley wheels to do so; a flexible sleeve slidably mounted on said support and entirely enclosing said support to define a closed circuit; said sleeve being corrugated in configuration whereby the extent of contact between the inner surface of said sleeve and said rigid support is minimized and whereby pockets are formed for storing lubricating material which may be placed within said sleeve; and at least two pulley wheels mounted on mounting means and supportably engaging said flexible sleeve at two spaced points whereby rotation of one of said wheels causes said sleeve to slide on said support and thereby rotate the other of said wheels.

* * * * *